US012240237B2

(12) United States Patent
Korthuis et al.

(10) Patent No.: US 12,240,237 B2
(45) Date of Patent: Mar. 4, 2025

(54) UNSUPPORTED TOP HAT LAYERS IN PRINTHEAD DIES

(71) Applicant: Hewlett-Packard Development Company, L.P., Spring, TX (US)

(72) Inventors: Vincent C. Korthuis, Corvallis, OR (US); Huyen Pham, Corvallis, OR (US); Tsuyoshi Yamashita, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 196 days.

(21) Appl. No.: 18/123,134

(22) Filed: Mar. 17, 2023

(65) Prior Publication Data

US 2023/0230790 A1 Jul. 20, 2023

Related U.S. Application Data

(63) Continuation of application No. 17/414,413, filed as application No. PCT/US2019/050025 on Sep. 6, 2019, now Pat. No. 11,648,773.

(51) Int. Cl.
*B41J 2/14* (2006.01)
*H01H 85/02* (2006.01)

(52) U.S. Cl.
CPC ........ *B41J 2/1404* (2013.01); *H01H 85/0241* (2013.01); *H01H 2085/0266* (2013.01); *H01H 2085/0275* (2013.01); *H01H 2085/0291* (2013.01)

(58) Field of Classification Search
CPC .... B41J 2/1404; B41J 2/14145; B41J 2/1603; B41J 2/1628; B41J 2/1629; B41J 2/1631; H01H 85/0241; H01H 2085/0266; H01H 2085/0275; H01H 2085/0291
See application file for complete search history.

(56) References Cited

U.S. PATENT DOCUMENTS

| | | | |
|---|---|---|---|
| 5,317,346 | A | 5/1994 | Garcia |
| 5,400,060 | A | 3/1995 | Carlotta |
| 5,414,454 | A | 5/1995 | Reid |
| 6,491,377 | B1 | 12/2002 | Cleland et al. |
| 6,588,875 | B1 | 7/2003 | Kleinhammer |
| 7,850,285 | B2 | 12/2010 | Yoshihira et al. |
| 8,197,029 | B2 | 6/2012 | Debrabander et al. |

(Continued)

FOREIGN PATENT DOCUMENTS

| | | | |
|---|---|---|---|
| CN | 101376283 | A | 3/2009 |
| CN | 105121166 | A | 12/2015 |

(Continued)

*Primary Examiner* — Lisa Solomon
(74) *Attorney, Agent, or Firm* — Foley & Lardner LLP

(57) ABSTRACT

In example implementations, a printhead die is provided. The printhead die includes a substrate, a chamber layer formed on the substrate, a plurality of printing fluid ejection chambers coupled to opposite sides of the chamber layer and along a length of the chamber layer, and a top hat layer formed on the chamber layer and the plurality of printing fluid ejection chambers. The chamber layer includes a void to store printing fluid. The top hat layer includes an initial unsupported top hat layer portion over the void, wherein the initial unsupported top hat layer portion comprises a first end that is narrower than a second end.

20 Claims, 7 Drawing Sheets

(56) References Cited

U.S. PATENT DOCUMENTS

| | | | |
|---|---|---|---|
| 9,132,654 | B1 | 9/2015 | Dryer et al. |
| 9,597,873 | B2 | 3/2017 | Rivas |
| 2007/0076044 | A1 | 4/2007 | Corley et al. |
| 2008/0303855 | A1 | 12/2008 | Bidwell et al. |
| 2009/0058952 | A1 | 3/2009 | Park et al. |
| 2011/0019210 | A1 | 1/2011 | Chung et al. |
| 2016/0325547 | A1* | 11/2016 | White .................. B41J 2/33515 |
| 2016/0368318 | A1 | 12/2016 | Van et al. |
| 2017/0072692 | A1 | 3/2017 | Chen et al. |
| 2018/0126732 | A1 | 5/2018 | Chen et al. |

FOREIGN PATENT DOCUMENTS

| | | | |
|---|---|---|---|
| CN | 105142908 | A | 12/2015 |
| CN | 106457829 | A | 2/2017 |
| CN | 106457892 | A | 2/2017 |
| CN | 108081757 | A | 5/2018 |
| JP | 2006-103034 | A | 4/2006 |
| JP | 2017-124617 | A | 7/2017 |

* cited by examiner

UNSUPPORTED TOP HAT LAYERS IN PRINTHEAD DIES

CROSS-REFERENCE TO RELATED PATENT APPLICATIONS

This application is a continuation of U.S. patent application Ser. No. 17/414,413, filed Jun. 16, 2021, which is a U.S. National Stage Entry under 35 U.S.C. § 371 of International Patent Application No. PCT/US2019/050025, filed Sep. 6, 2019, the entireties of which are incorporated by reference herein.

BACKGROUND

Printers are used to print images onto a print medium. Printers may print images using different types of printing fluids and/or materials. For example, some printers may use ink, toner, and the like. A print job may be transmitted to the printer and the printer may dispense the printing fluids and/or materials on the print medium in accordance with the print job.

The printing fluid may be ejected from a printhead. The printheads may be packaged and sealed to prevent the printing fluid from leaking during transport.

DETAILED DESCRIPTION

Examples described herein provide an integrated printhead with an improved unsupported top hat layer and chamber to prevent tearing of the top hat layer during a de-taping process. For example, printheads can be packaged and sealed after manufacturing to ensure that the printing fluid in the printhead does not leak or evaporate before use.

As printhead technology has advanced, the materials used in the manufacturing processes have also changed. In some examples, tape can be placed over the printhead to prevent the printing fluid from leaking. However, when the tape is removed, the removal of the tape may create deflection and stress on the portions of the printhead that can result in damage to the printhead. The resulting damage can cause the printing fluid to leak or escape.

Mechanical solutions can be created, but the mechanical solutions can be expensive to implement. Tape is a relatively low cost material that can help to reduce the overall costs of the printhead.

Examples herein provide a printhead that minimizes beam length (e.g., a width across an unsupported top hat portion) where taping begins to minimize an amount of deflection when the tape is removed. Minimizing the amount of deflection at the point of initiation of tape adhesive to the unsupported top hat layer may prevent the top hat layer from being damaged when the tape is removed. As a result, tape can still be used to seal the printing fluid in the printhead without damaging the top hat layer of the printhead during removal of the tape by the customer.

Figure 1A:
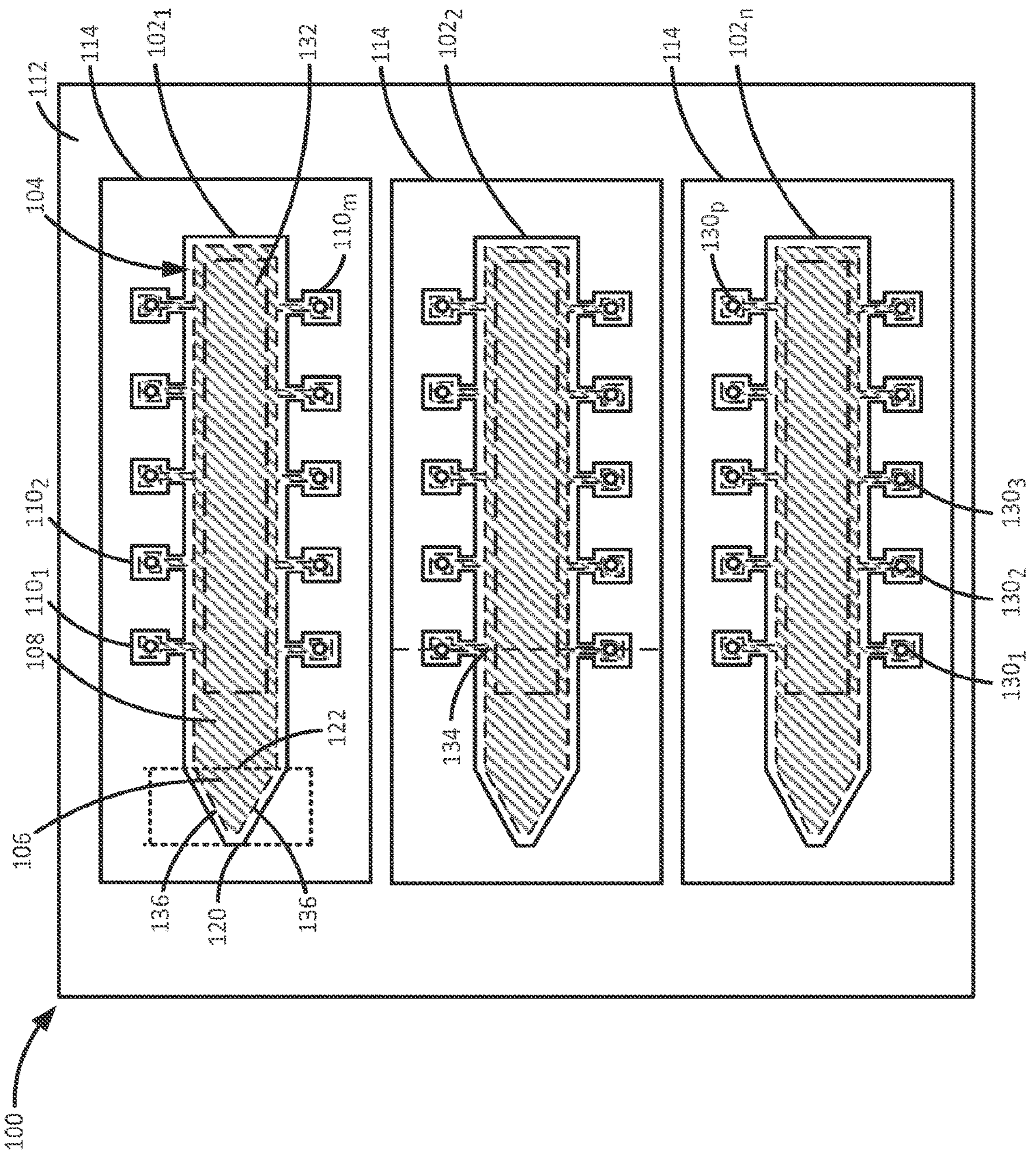
FIG. 1A is a block diagram of a top view of an example a printhead die of the present disclosure.
Figure 2:
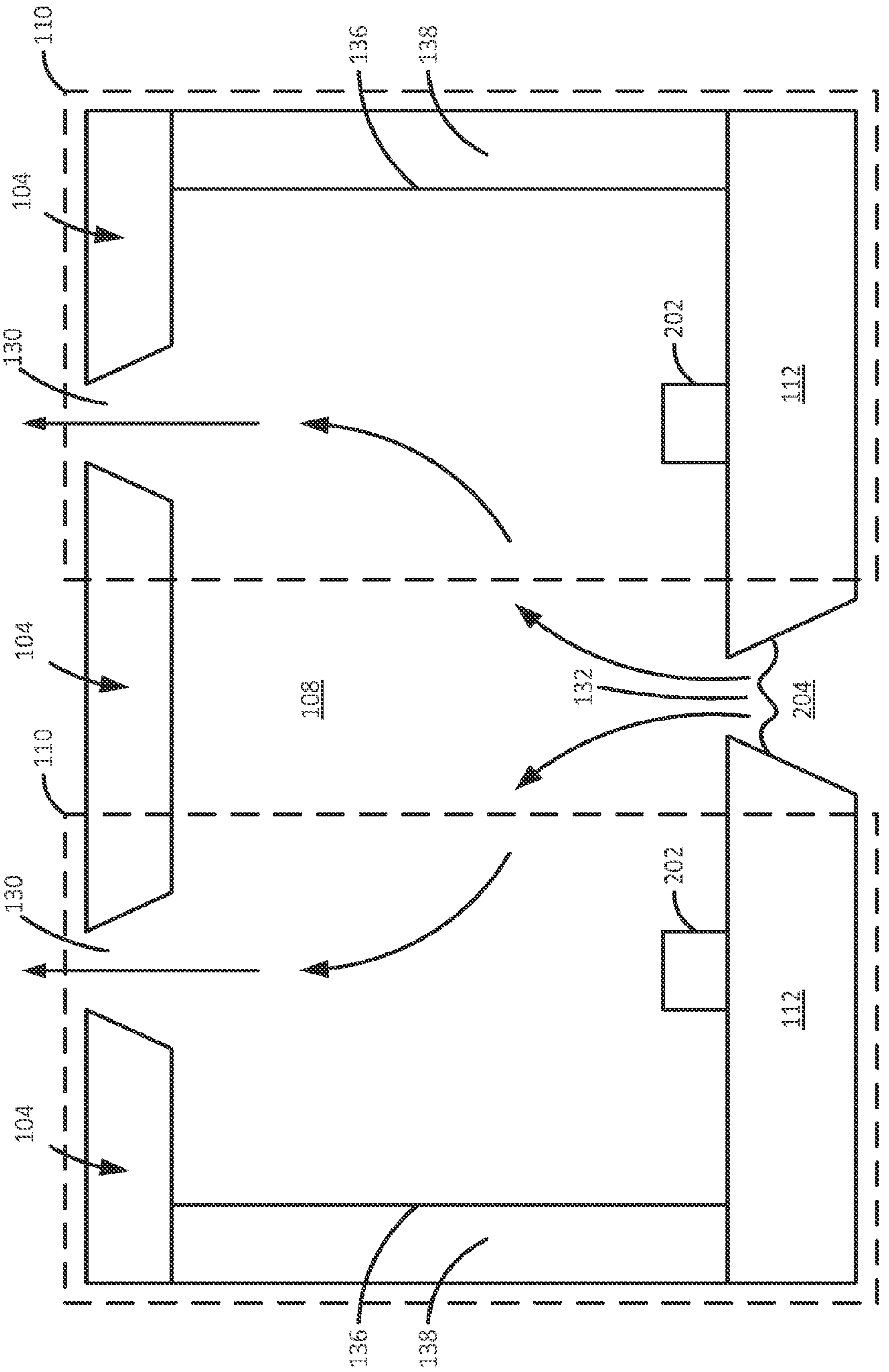
FIG. 2 is a block diagram of a cross-sectional view of an example chamber of the printhead of the present disclosure.

FIG. 1A illustrates a top view of an example printhead die 100 and FIG. 2 illustrates a cross-sectional view of the example printhead die 100 along a dashed line 134. The reader may refer to FIG. 1A and FIG. 2 simultaneously to view the different layers of the printhead die 100 that are discussed in FIG. 1A, but may be difficult to see in the top view illustrated in FIG. 1A.

In one example, the printhead die 100 may be part of an integrated printhead (IPH). IPHs may be devices that combine an ink cartridge with a printhead. In other words, unlike some printers that have distinct printheads and printing fluid containers (e.g., off-axis ink supply with permanent printheads), the printhead may be integrated into the ink cartridge in an IPH.

In one example, the printhead die 100 may include a substrate 112 that includes slotted portions $\mathbf{102}_1$-$\mathbf{102}_n$ that form a fluidic connection to the printhead (hereinafter also referred to individually as a slotted portion 102 and collectively as slotted portions 102). In an example, the substrate 112 may be a silicon substrate. The slotted portions 102 may each be associated with a different colored printing fluid.

Although multiple slotted portions 102 are illustrated in FIG. 1A, it should be noted that a single slotted portion may be included in a single printhead die 100. In other words, printhead die 100 can be fabricated with multiple slotted portions 102 for multiple colors or can be fabricated with a single slotted portion 102 for a single color.

The number of slotted portions 102 created in the substrate 112 may be a function of a number of different colors of printing fluid that are dispensed by the printhead die 100. For example for a printhead die 100 that dispenses cyan, yellow, and magenta colors, the printhead die 100 may have three slotted portions 102 (e.g., a cyan slot, a yellow slot, and a magenta slot on a single printhead substrate 112).

In one example, the slotted portions 102 may include a top hat layer 104, and a chamber layer 138 (illustrated in FIG. 2) that is beneath the top hat layer 104 that is etched to form walls 136. As shown in FIG. 2, the top hat layer 104 may be arranged above the chamber layer 138 and also above the substrate 112. Thus, as illustrated in FIG. 1A, the top hat layer 104 is to be understood as being arranged above both the substrate 112 and the chamber layer 138 (e.g., in the z-axis, coming out of the page). The walls 136 are illustrated as dashed lines that surround a perimeter of the slotted portions 102. FIG. 2 illustrates how the walls 136 support the outer edges of the top hat layer 104.

The portions of the chamber layer 138 that are etched away may form a void 108. The void 108 is illustrated in diagonal lines in the top view illustrated in FIG. 1A. FIG. 2 illustrates the void 108 as a volume formed between the top hat layer 104, the walls 136 of the chamber layer 138, and the substrate 112. The portions of the top hat layer 104 that are over the void 108 may be referred to as the unsupported top hat layer 104. The portions of the top hat layer 104 that rest on the chamber layer 138 and/or the walls 136 may be referred to as the supported top hat layer portion.

Figure 1B:
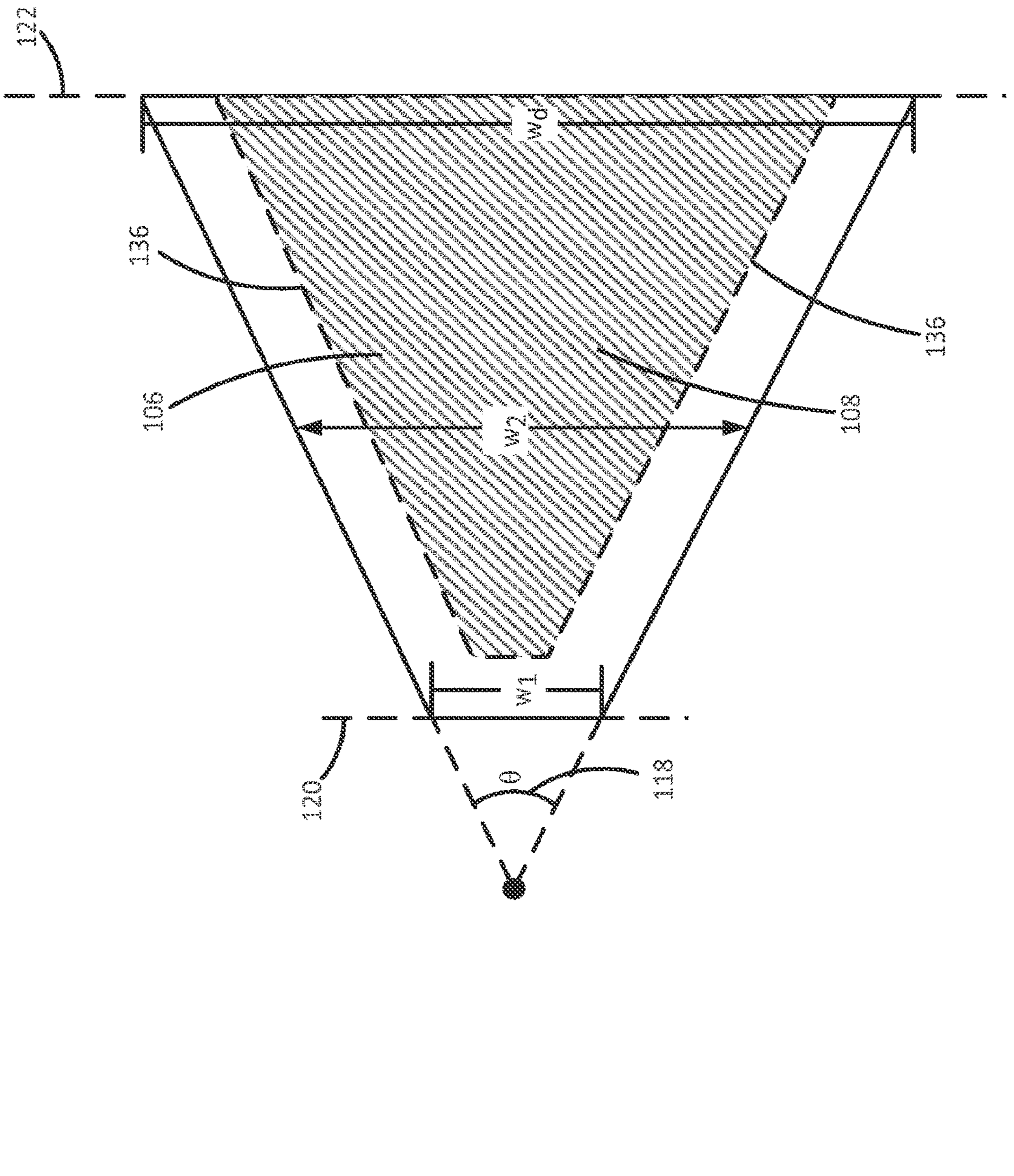
FIG. 1B is a block diagram of a closer up view of an initial unsupported top hat layer portion of printhead die of the present disclosure.

In one example, the top hat layer 104 may include an initial unsupported top hat layer portion 106. The initial unsupported top hat layer portion 106 may be defined by a first end 120 and a second end 122. FIG. 1B illustrates a more detailed view of the initial unsupported top hat layer portion 106, and is discussed in further details below.

As illustrated in FIG. 2, the void 108 in the chamber layer 138 may form a volume to store printing fluid 204. The void 108 may run along a length of the slotted portion 102 and may also be referred to as a fluid channel that runs along a length of the slotted portion 102. The printing fluid 204 may be fed through an ink feed hole 132 (shown in dashed lines in FIG. 1A) formed through the substrate 112, as shown in FIG. 2.

The printing fluid 204 may then be ejected via printing fluid ejection chambers $\mathbf{110}_1$ to $\mathbf{110}_m$ (of which only $\mathbf{110}_1$, $\mathbf{110}_2$, and $\mathbf{110}_m$ are labeled, hereinafter also referred to individually as a printing fluid ejection chamber 110 or collectively as printing fluid ejection chambers 110). The printing fluid ejection chambers 110 may be formed or coupled to opposite sides of the fluid channel and along a length of the chamber layer 138 and top hat layer 104. Said another way, in FIG. 1A, if the top view of the slotted portion 102 were divided along a length of the slotted portion (e.g., left to right when viewing the page), the printing fluid ejection chambers 110 may be formed on opposite sides (e.g., along the perimeter on both sides of the slotted portion 102 when viewed from the top as shown in FIG. 1A). An opening $\mathbf{130}_1$ to $\mathbf{130}_p$ (of which only $\mathbf{130}_1$, $\mathbf{130}_2$, $\mathbf{130}_3$, and $\mathbf{130}_p$ are labeled; hereinafter also referred to individually as an opening 130 or collectively as openings 130) may be formed in the top hat layer 104 over each one of the printing fluid ejection chambers 110.

The printing fluid ejection chambers 110 are shown formed as a portion of the cross-section of FIG. 2 shown by dashed lines. The volume created by the void 108 may store the printing fluid 204 that is fed through the ink feed hole 132. The printing fluid 204 may be fed to each one of the printing fluid ejection chambers 110 during operation of the printhead die 100. For example, the printing fluid 204 may flow through the fluid channel that runs into and out of the page in FIG. 2.

FIG. 2 illustrates the openings 130 of the printing fluid ejection chambers 110. The openings 130 may allow the printing fluid 204 to be ejected one drop at a time. The printing fluid may be ejected by an actuator 202 that forces the printing fluid through the openings 130 (e.g., a resistive element, a piezo actuator, etc.).

In one example, the top hat layer 104 and the chamber layer 138 may be formed or fabricated from the same material. For example, the top hat layer 104 and the chamber layer 138 may be fabricated from a photo definable polymer or negative photoresist material. An example of the photo definable polymer may include SU8. The photo definable polymer may be soft or flexible.

In one example, the chamber layer 138 may be formed by depositing the photo definable polymer onto the substrate 112. A lithography and etching process may be applied to the photo definable polymer to form the void 108. The top hat layer 104 may be a thin layer that is deposited on top of the chamber layer 138 via a plastic film that can be removed. Lithography and etching steps can be applied to form openings 130 in the top hat layer 104 at the locations of the printing fluid ejection chambers 110.

In one example, the printing fluid ejection chambers 110 may eject the printing fluid 204 using a thermal resistor in the actuator 202. For example, to eject the printing fluid 204, a thermal resistor may heat a fluid in the printing fluid ejection chambers 110. The heat may cause a steam bubble to be formed in the fluid and burst towards an opening of the printing fluid ejection chamber 110. The printing fluid may be fed into the printing fluid ejection chambers 110 from the void 108 and the force of the bubble formation may cause a droplet of printing fluid 204 to be ejected from the printing fluid ejection chambers 110.

It should be noted that the printhead 100 has been simplified for ease of explanation. The printhead die 100 may include additional components and circuitry that are not shown. For example, the printhead die 100 may include connection interfaces to a controller or other electronics, a housing, thin film dielectrics, thin film conductors, and the like.

Referring back to FIG. 1A, the printhead die 100 may be shipped with an adhesive tape 114 over each slotted portion 102 or a single piece of the adhesive tape 114 over all three slotted portions 102. The adhesive tape 114 may be applied to prevent the printing fluid from leaking out of the openings 130 in the top hat layer 104 over the printing fluid ejection chambers 110 during shipping. However, when the adhesive tape 114 is removed before the printhead die is used, the adhesive tape 114 may damage the top hat layer 104. For example, a portion of the top hat layer 104 can be damaged or torn by tape adhesive forces on the unsupported top hat layer portions of the top hat layer 104 causing the printing fluid 204 to leak from the chamber layer void 108.

The present disclosure improves the initial unsupported top hat layer portion 106 to prevent damage during removal of the adhesive tape 114. In one example, the initial unsupported top hat layer portion 106 may be soft or flexible and be damaged from removal of the adhesive tape 114. However, the present disclosure forms the initial unsupported top hat layer portion 106 to minimize or significantly reduce the amount of deflection or stress applied to the top hat layer 104 when the adhesive tape 114 is removed. The amount of deflection created by the adhesive tape 114 may be a function of the width of a surface that is attached to the adhesive tape 114.

FIG. 1B illustrates a more detailed view of the initial unsupported top hat layer portion 106. In one example, the unsupported top hat layer portion 106 may be formed to gradually increase a width ($w_1$) from the first end 120 to a gradually wider width ($w_2$) to a desired width ($w_d$) at the second end 122. In other words, $w_d > w_2 > w_1$. The widths $w_1$, $w_2$, and $w_d$ may also be referred to as the beam length of the top hat layer 104.

The first end 120 may be an end where the adhesive tape 114 begins. The second end 122 may be where a desired width of the top hat layer 104 is reached and where the printing fluid ejection chambers 110 begin. The width, $w_1$, of the first end 120 may be at a particular width that minimizes the amount of deflection of the adhesive tape 114 at a point of initiation of the adhesive tape 114 to the printhead die 100.

The width may be gradually increased until a desired width, $w_d$, of the top hat layer 104 is reached. For example, the width of the first end 120 may be less than the width of the second end 122. The first end 120 may be narrower than the second end 122. Said another way, the first end 120 may be a narrow end and the second end 122 may be a wide end.

In one example, the first end 120 may have a beam length or a width that is approximately one tenth of a beam length or a width of the second end 122. For example, the first end 120 may have a width of approximately 5-20 microns and the second end 122 may have a width of approximately 100-150 microns. In one example, the first end 120 may have a width of approximately 8 microns and the second end 122 may have a width of approximately 130 microns.

Said another way, the first end 120 of the initial unsupported top hat layer portion 106 may be tapered relative to the second end 122 of the initial unsupported top hat layer portion 106. In one example, the side walls 136 of the initial unsupported top hat layer portion 106 (and corresponding portions of the chamber layer that form the walls 136) may be formed at a particular angle θ from the first end 120 towards the second end 122. The angle θ may be relative to an imaginary point where the two side walls 136 may meet if the walls were continued to the imaginary point, as shown by line 118 in FIG. 1B. In one example, the angle may be approximately 30-70 degrees. In one example, the angle may be approximately 45 degrees.

Thus, the form of the initial unsupported top hat layer portion 106 may allow the initial deflection and stress caused from the initial removal of the adhesive tape 114 to be minimized. Minimization of the deflection force may prevent damage to the initial unsupported top hat layer portion 106 as well as the remaining supported top hat layer portions of the top hat layer 104. As the length of the adhesive tape 114 that is removed increases, the deflection force and stress may start to gradually increase as the beam length of the initial unsupported top hat layer portion 106 is increased. The gradually increasing stress may reduce failure rates compared with starting with a beam length of the unsupported top hat layer portion 106 that is large. Thus, the width of the initial unsupported top hat layer portion 106 may be gradually increased up to the desired width of the second end 122 of the initial unsupported top hat layer portion 106.

Figure 3:
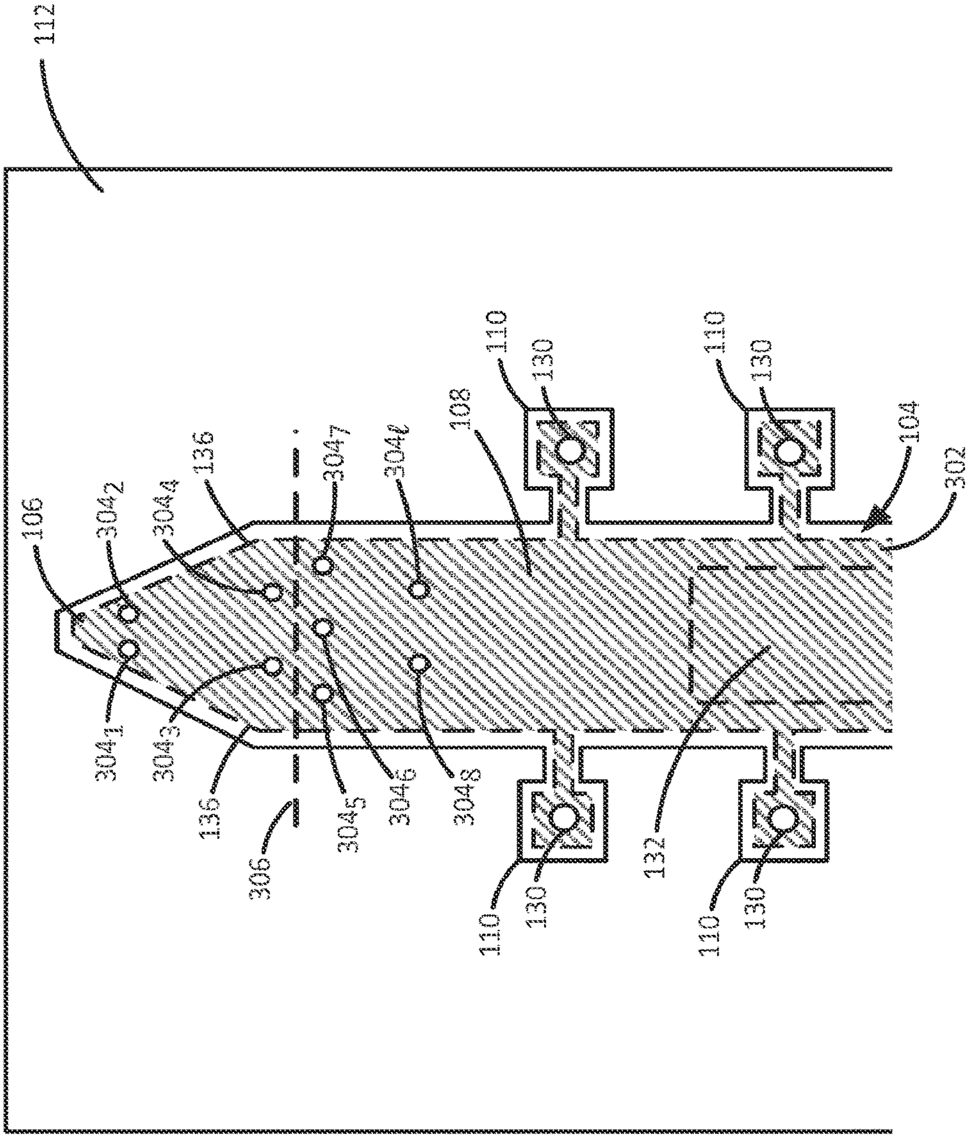
FIG. 3 is a block diagram of a top view of an example of a printhead die with pillars of the present disclosure.

FIG. 3 illustrates a top view of an example of a slotted portion 302 of a printhead die. In one example, the slotted portion 302 may include a top hat layer 104 and a void 108 (shown as diagonal lines) formed in a portion of a chamber layer, and printing fluid ejection chambers 110 similar to the slotted portion 102, illustrated in FIG. 1A and described above. The printing fluid ejection chambers 110 may be coupled to or formed on opposite sides of the fluid channel, and along a length of the walls 136.

In one example, the slotted portion 302 may also include openings 130 in the top hat layer 104 over locations of the printing fluid ejection chambers 110. The slotted portion 302 may also include the ink feed hole 132.

The void 108 may be formed in the chamber layer to create a volume. The void 108 may store printing fluid 204. The printing fluid 204 may be ejected by the printing fluid ejection chambers 110, as described above. The slotted portion 302 may also include an initial unsupported top hat layer portion 106.

The initial unsupported top hat layer portion 106 may also be formed to minimize deflection and/or stress caused by removal of adhesive tape applied to the slotted portion 302 before shipping. For example, the initial unsupported top hat layer portion 106 may also have a tapered shape or a trapezoidal shape, as described above in reference to the initial unsupported top hat layer portion 106 of the slotted portion 102.

However, the slotted portion 302 may include pillars $\mathbf{304}_1$ to $\mathbf{304}_l$ (hereinafter also referred to individually as a pillar 304 or collectively as pillars 304). In one example, the pillars 304 may provide extra support. For example, the pillars 304 may provide a structure or surface to bond to the unsupported top hat layer portion 106. This bond may further prevent the unsupported top hat layer portion 106 from being damaged when the adhesive tape 114 is removed.

In one example, the pillars 304 may be fabricated from the same material as the top hat layer 104 and the chamber layer. For example, the pillars 304 may also be fabricated from a photo definable polymer or negative photoresist material, such as SU8, for example.

In one example, the pillars 304 may have a diameter that is a function of a size of the slotted portion 302. For example, the larger (e.g., width and length) the slotted portion 302 is, the larger the diameter of the pillars 304 may be. In one example, the diameter of the pillars 304 may be approximately 1-5 microns. In one example, the diameter of the pillars 304 may be approximately 2 microns.

In one example, the pillars 304 may have the same diameters. In one example, the pillars 304 may have different diameters.

In one example, some of the pillars 304 may be located in different areas of the initial unsupported top hat layer portion 106. For example, the pillars $\mathbf{304}_1$ and $\mathbf{304}_2$ may be located towards a tip or first end of the initial unsupported top hat layer portion 106. The pillars $\mathbf{304}_3$-$\mathbf{304}_1$ may be located through the void 108 closer to a second end of the initial unsupported top hat layer portion 106.

Figure 4:
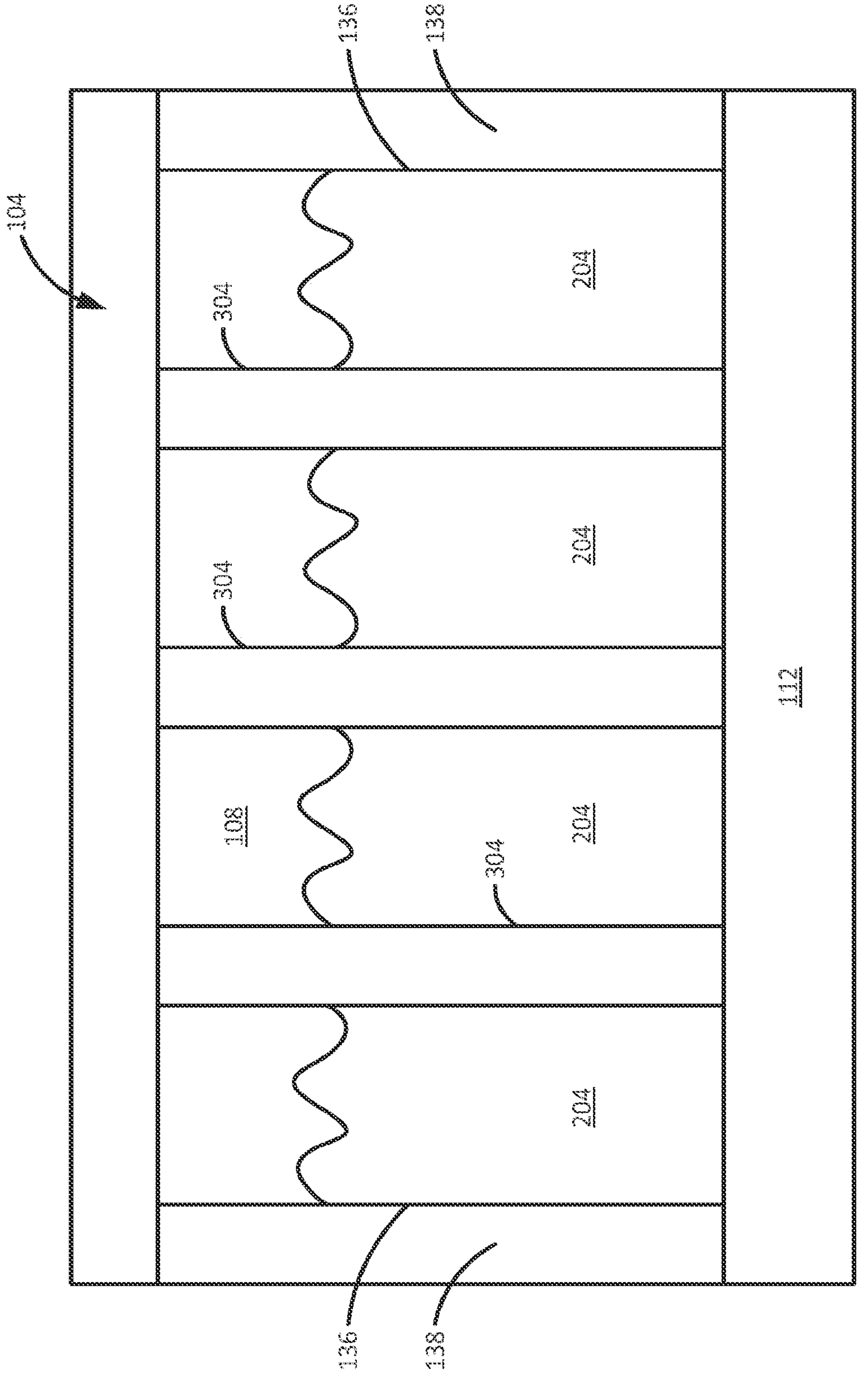
FIG. 4 is a block diagram of a cross-sectional view of an example chamber of a printhead with pillars of the present disclosure.

FIG. 4 illustrates a cross-sectional view along a dashed line 306 illustrated in FIG. 3. The cross-section view illustrates an example of the void 108 with the pillars 304. In one example, the void 108 may be formed in the chamber layer to create a volume created by a surface of the substrate 112, the side walls 136 of the chamber layer and the top hat layer 104. The volume created by the void 108 may store a printing fluid 204. The printing fluid 204 may be fed to each one of the printing fluid ejection chambers 110 during operation of the printhead die 100.

As shown in FIG. 4, the pillars 304 may be formed through the void 108. The pillars 304 may be bonded to the top hat layer 104 and the surface of the substrate 112. Thus, the pillars 304 help to further prevent the initial unsupported top hat layer portion 106 from being damaged, torn, pulled off, and so forth, when the adhesive tape 114 is removed from the slotted portion 302.

It should be noted that although a particular arrangement of the pillars 304 is illustrated in FIG. 3 that the pillars 304 may be arranged in any shape or distribution. For example, more than two pillars may be arranged in the supported top hat layer portion of the top hat layer 104 and less than, or more than, five pillars 304 may be arranged in a regular or irregular pattern through the void 108 in the initial unsupported top hat layer portion 106.

Figure 5:
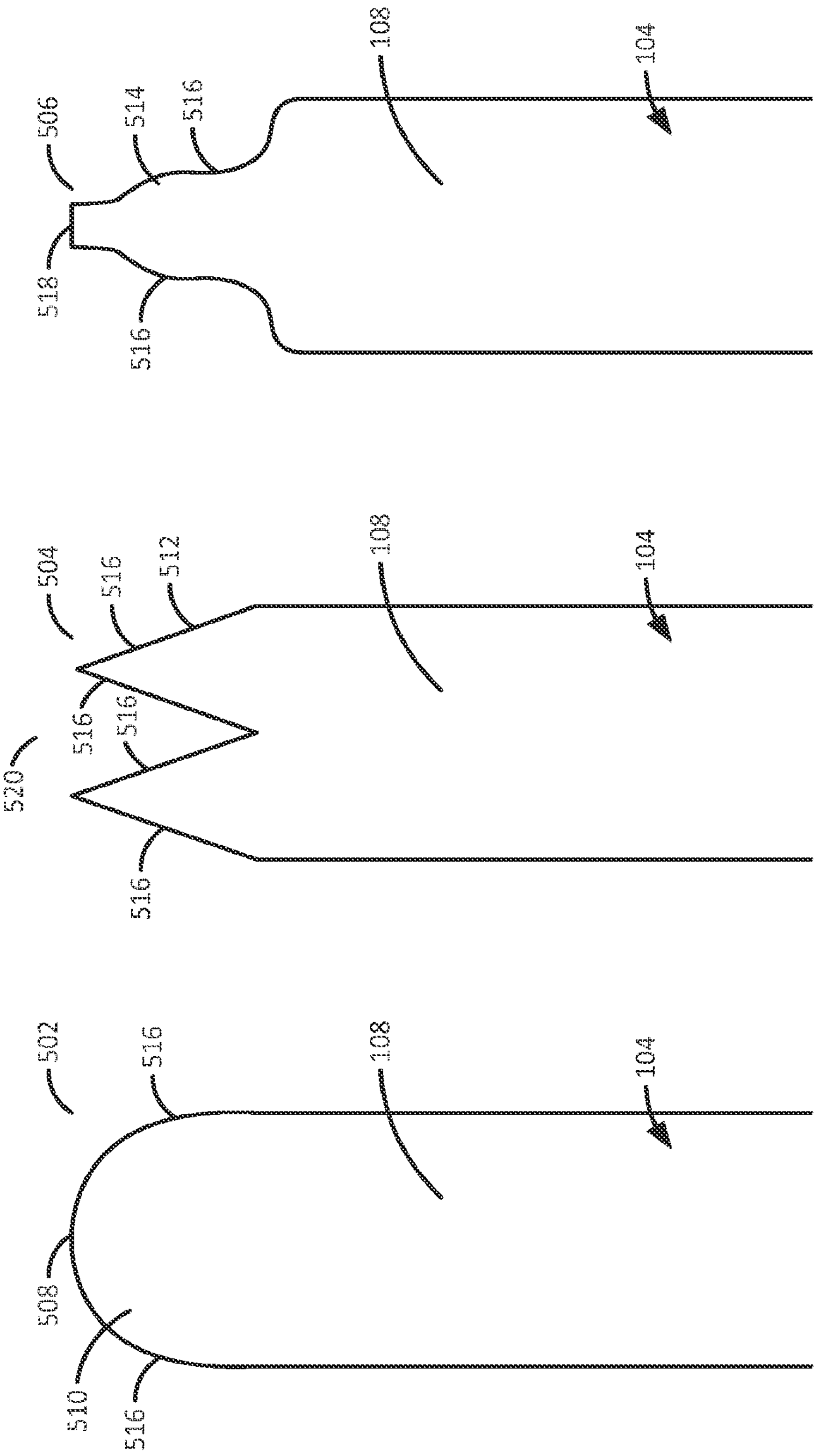
FIG. 5 is a block diagram of a top view of another example of a printhead of the present disclosure.

FIG. 5 illustrates a block diagram of other examples of initial unsupported top hat layer portions 106 of slotted portions of a printhead die of the present disclosure. For example, the slotted portions 102 and 302 illustrated in FIGS. 1 and 3 illustrate an unsupported top hat layer portion 106 that has a trapezoidal shape with straight lined side walls 136. The side walls 136 extend from the first end 120 to the second end 122 in a symmetrical form.

However, it should be noted that the side walls 136 between the first end 120 and the second end 122 may be formed in other shapes and forms. For example, the slotted portion 502 may have an initial unsupported top hat layer portion 510 formed by a top hat layer 104 over a void 108. The initial unsupported top hat layer portion 510 may have side walls 516 that form a domed or "fire-hydrant" shape. For example, a first end 508 of the initial unsupported top hat layer portion 510 may have an initial width and then curve out gradually to a desired width.

In one example, a slotted portion 504 may have an initial unsupported top hat layer portion 512 formed by a top hat layer 104 over a void 108. The initial unsupported top hat layer portion 512 may have side walls 516 that form multiple "points" on a first end 520. For example, the initial unsupported top hat layer portion 512 may have an "M" shape or any other shape with multiple "points". Each point may have a width that gradually increases from the first end 520 and meets to a desired width.

In one example, a slotted portion 506 may have an initial unsupported top hat layer portion 514 formed by a top hat layer 104 over a void 108. The initial unsupported top hat layer portion 514 may have irregular shaped side walls 516. For example, the side walls 516 of the initial unsupported top hat layer portion 514 may have multiple curves as the width gradually increases from the first end 518 to a desired width.

It should be noted that the slotted portions 502, 504, and 506 illustrated in FIG. 5 are provided as additional examples and should not be considered limiting. For example, the initial unsupported top hat layer portion 106 of the printhead may have other shapes that are not illustrated in FIGS. 1, 3, and 5. For example, although the sidewalls are shown each having the same shape, the sidewalls of the initial unsupported top hat layer portion 106 may have different shapes. For example, one side wall may be straight and the opposite side wall may have a curve or an irregular shape.

In one example, the shape of the initial unsupported top hat layer portion 106 may be a function of other components in the printhead. For example, the printhead may have a deflection plate or other component that may be covered by the initial unsupported top hat layer portion 106. Thus, the unsupported top hat layer portion 106 may have a gradual increase in width from a first end as long as all of the components within the respective slotted portion of the printhead die are covered by the initial unsupported top hat layer portion 106.

Figure 6:
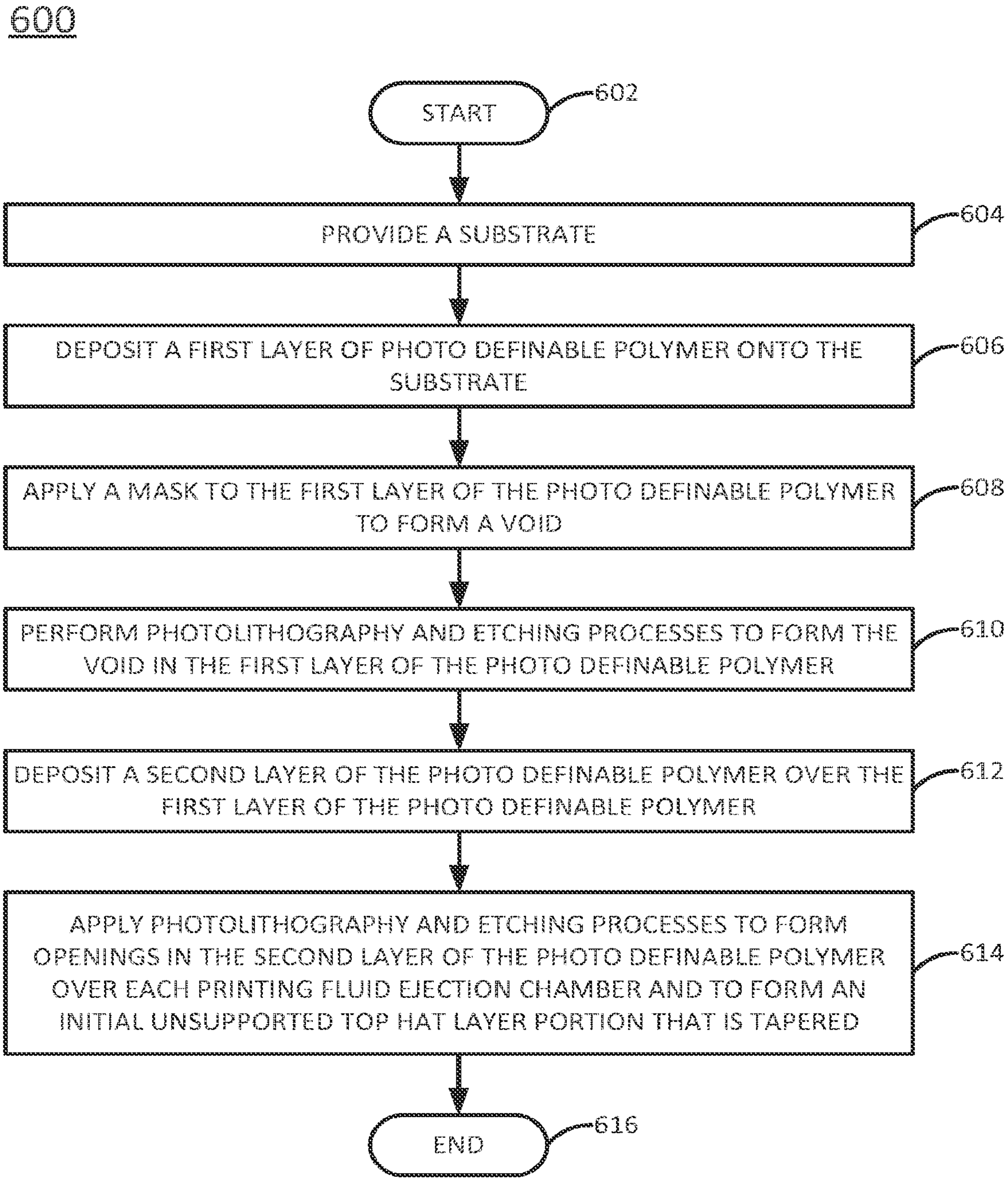
FIG. 6 is a flow chart of an example method for fabricating the printhead die of the present disclosure.

FIG. 6 illustrates a flow diagram of an example process flow 600 for fabricating a printhead die of the present disclosure. In an example, the process flow 600 may be performed by different tools or equipment that are operated individually or collectively by a single controller or processor.

At block 602, the method 600 begins. At block 604, the method 600 provides a substrate. For example, substrate may be a silicon wafer and may include integrated circuit thin films and processes. Each silicon wafer may be processed to form multiple printhead dies. In one example, an ink feed hole may be etched out of the substrate to allow printing fluid to enter the printhead die.

At block 606, the method 600 deposits a first layer of photo definable polymer onto the substrate. The photo definable polymer may be a negative photo resist material such as SU8. The photo definable polymer material may be deposited onto portions of the printed circuit board where the printheads may be formed. The first layer of photo definable material may form the chamber layer.

At block 608, the method 600 applies a mask to the first layer of the photo definable polymer to form a void. For example, the mask may be applied to the first layer to define areas in the photo definable polymer where the void to store printing fluid will be formed.

At block 610, the method 600 performs photolithography and etching processes to form the void in the first layer of the photo definable polymer. For example, the photolithography steps may include exposing portions of the photo definable polymer to certain types of light. The etching process may include wet etch and/or dry etch processes to remove the portions of the photo definable polymer that are exposed to the light. In one example, the etching process may include wet etch and/or dry etch processes to remove the portions of the photo definable polymer that were not exposed to the light.

In one example, the remaining portions of the chamber layer may form the walls to support portions of a subsequently deposited top hat layer. In one example, pillars may also be formed in the first layer of the photo definable polymer. For example, the pillars may be formed via a masking, photolithography, and etching processes. The pillars may provide a surface to bond to an initial unsupported top hat layer portion that is formed, as discussed above. The bond may provide more support to the initial unsupported top hat layer portion, and as such may reduce occurrences of damage to the top hat layer when adhesive tape applied to the slotted portion is removed.

At block 612, the method 600 deposits a second layer of the photo definable polymer over the first layer of the photo definable polymer. For example, the second layer of the photo definable polymer may be pushed onto the previously deposited chamber layer using a plastic film to form a top hat layer. The top hat layer may be much thinner than the chamber layer.

In one example, the portions of the top hat layer that rest on the remaining walls of the chamber layer may form supported or rigid portions of the top layer. The portions of the top hat layer that sit over a void formed in the chamber layer may form unsupported portions of the top hat layer.

At block 614, the method 600 may apply photolithography and etching steps to form openings in the second layer of the photo definable polymer over each printing fluid ejection chamber and to form an initial unsupported top hat layer portion that is tapered. For example, the initial unsupported top hat layer portion may be formed with the first end at an initial width. The side walls of the initial unsupported top hat layer portion may gradually move away from one another to form a second end having a second width. The second width may be greater than the first width. The second width may be a desired width of the top hat layer of the printhead die. The chamber layer may also be etched to have an end that has a tapered portion that matches the shape of the initial unsupported top hat layer portion in block 610.

The side walls may gradually move away from one another in a regular form at approximately 45 degrees. In another example, the side walls may move away in an irregular form. The side walls may be straight, may have a curved surface, or have surface with multiple different curves, portions, and/or segments until forming the second end with the second width. At block 616, the method 600 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A printhead die comprising:

a substrate;

a chamber layer on the substrate; and a top hat layer on the chamber layer, the top hat layer comprising an initial unsupported top hat layer portion comprising a first end that is narrower than a second end.

2. The printhead die of claim 1, wherein the initial unsupported top hat layer portion forms a trapezoidal shape.

3. The printhead die of claim 1, wherein the first end of the initial unsupported top hat layer portion forms a dome shape that curves towards the second end.

4. The printhead die of claim 1, wherein the initial unsupported top hat layer portion comprises side walls that form an "M" shape at the first end.

5. The printhead die of claim 1, wherein the initial unsupported top hat layer portion comprises side walls that meet at one or more points at the first end.

6. The printhead die of claim 1, wherein the initial unsupported top hat layer portion comprises curved side-walls extending between the first end and the second end.

7. The printhead die of claim 1, wherein the initial unsupported top hat layer portion comprises straight side-walls extending between the first end and the second end.

8. The printhead die of claim 1, wherein the chamber layer and the top hat layer comprise a same material.

9. The printhead die of claim 8, wherein the material comprises a photo definable polymer or a negative photo-resist material.

10. The printhead die of claim 1, wherein the chamber layer comprises side walls defining a void to store printing fluid.

11. The printhead die of claim 1, further comprising a plurality of printing fluid ejection chambers coupled to opposite sides of the chamber layer and along a length of the chamber layer.

12. The printhead die of claim 1, wherein the first end has a width that is one tenth of the width of the second end.

13. The printhead die of claim 1, wherein the chamber layer further comprises a plurality of pillars to support the initial unsupported top hat layer portion.

14. A printhead die comprising:

a substrate; and a plurality of slotted portions on the substrate, each of the plurality of slotted portions comprising:

a chamber layer on the substrate; and a top hat layer on the chamber layer, the top hat layer comprising an initial unsupported top hat layer portion comprising a first end that is narrower than a second end.

15. The printhead die of claim 14, wherein each of the plurality of slotted portions is configured to store printing fluid of a different color.

16. The printhead die of claim 14, wherein the chamber layer of each of the plurality of slotted portions comprises side walls defining a void to store printing fluid.

17. The printhead die of claim 14, wherein each of the plurality of slotted portions comprises a plurality of printing fluid ejection chambers coupled to opposite sides of the chamber layer and along a length of the chamber layer.

18. A method for fabricating a printhead die, the method comprising:

providing a substrate;

depositing a first layer of a photo definable polymer on the substrate for defining a chamber layer;

depositing a second layer of the photo definable polymer over the first layer for defining a top hat layer; and defining an initial unsupported top hat layer portion of the top hat layer, the initial unsupported top hat layer portion comprising a first end that is narrower than a second end.

19. The method of claim 18, wherein the second layer is thinner than the first layer.

20. The method of claim 18, further comprising:

applying a mask to the first layer for forming a void in the chamber layer; and performing photolithography and etching for defining the void in the chamber layer for storing printing fluid.

* * * * *